(12) United States Patent
Talley et al.

(10) Patent No.: US 7,398,476 B2
(45) Date of Patent: Jul. 8, 2008

(54) GRAPHICAL LIST GROUPING WIDGET AND METHODS OF USE THEREOF

(76) Inventors: Stephen C. Talley, 4545 Comanche Dr., Apt. C, Boulder, CO (US) 80303; Stephen J. Wolf, 728 Gold Way, Superior, CO (US) 80027

( * ) Notice: Subject to any disclaimer, the term of this patent is extended or adjusted under 35 U.S.C. 154(b) by 484 days.

(21) Appl. No.: 11/080,953

(22) Filed: Mar. 14, 2005

(65) Prior Publication Data

US 2005/0160370 A1    Jul. 21, 2005

Related U.S. Application Data

(63) Continuation of application No. 09/921,544, filed on Aug. 2, 2001, now Pat. No. 6,918,092.

(60) Provisional application No. 60/285,482, filed on Apr. 20, 2001.

(51) Int. Cl.
*G06F 3/048* (2006.01)

(52) U.S. Cl. ........................ 715/769; 715/759; 715/762; 715/788

(58) Field of Classification Search ......... 715/762–765, 715/769, 788, 825, 798, 783, 826, 759
See application file for complete search history.

(56) References Cited

U.S. PATENT DOCUMENTS

| | | | |
|---|---|---|---|
| 5,774,119 A | 6/1998 | Alimpich et al. | |
| 5,818,444 A | 10/1998 | Alimpich et al. | |
| 5,861,886 A * | 1/1999 | Moran et al. | 715/863 |
| 5,874,964 A | 2/1999 | Gille | |
| 6,081,620 A | 6/2000 | Anderholm | |
| 6,147,685 A | 11/2000 | Bliss et al. | |
| 6,237,142 B1 | 5/2001 | Brodsky et al. | |
| 7,139,983 B2 * | 11/2006 | Kelts | 715/802 |
| 7,246,311 B2 * | 7/2007 | Bargeron et al. | 715/517 |

* cited by examiner

*Primary Examiner*—Tadesse Hailu

(57) ABSTRACT

Apparatus and methods for segmenting sets of distinct entities into groups with associated boundaries, wherein the associated boundaries have an associated logic are disclosed. The interaction of an object, a set of objects, another group, or combinations thereof with a group's associated boundary is accounted for by the logic of the invention such that the group and its associated boundary are modified with respect to the interaction.

20 Claims, 13 Drawing Sheets

GRAPHICAL LIST GROUPING WIDGET AND METHODS OF USE THEREOF

CROSS REFERENCE TO RELATED APPLICATION

This application is a continuation of U.S. patent application Ser. No.: 09/921,544, filed Aug. 2, 2001, now U.S. Pat. No. 6,918,092 entitled "Graphical List Grouping widget and Methods of Use Thereof," which priority under U.S.C. 119(e) of U.S. Provisional Application No.: 60/285,482 filed Apr. 20, 2001 entitled, "GRAPHICAL LIST GROUPING WIDGET" which is incorporated by reference in its entirety for all purposes.

BACKGROUND OF THE INVENTION

1. Field of the Invention

This invention relates to software technology. More specifically, it relates to graphical user interface widget suitable for logical grouping and group manipulation.

2. Description of the Related Art

Graphical applications are becoming increasingly popular with computer users. High resolution pictures, animation, and other visual and graphical effects displayed on a computer screen have become commonplace as computer microprocessors are developed having greater speed and processing power. Graphical user interfaces (GUI's), for example, are used widely. It is generally accepted that computers having graphical user interfaces (GUI's) are easier to use, and that it is quicker to learn an application program in a GUI environment than in a non-GUI environment.

Current GUI's that use grouping and group manipulation do not address the need for logical group manipulation. Conventional grouping tools or widgets are static in nature. Graphics software tools such as VISIO™ or POWERPOINT™ available from Microsoft Corporation of Redmond Wash., and CHEMDRAW™ available from CambridgeSoft Corporation of Cambridge Mass., are all examples wherein sets of objects can be grouped and ungrouped, and positioned about the visual display. For example, one can select a set of objects, input a grouping command, and the set then is defined as a group. Also the group can be undefined or segmented by selecting the set of objects or a sub-set thereof, and entering an ungroup command. As well, a number of hierarchical layers of grouped objects can be established, aiding in manipulation and positioning of groups about the display.

Another realm of the GUI is in spreadsheet software, for example EXCEL™ available from Microsoft Corporation of Redmond Wash. Spreadsheet software like these allow a user to select a cell or a set of cells (with data therein) and move the cell or set about a given spreadsheet or spreadsheets. Current spreadsheet software does not provide for logical grouping functions and group interaction as described above for graphics software. For example, if a set of cells is selected and moved within a spreadsheet, the data within each cell of the set is simply "dumped" into each of the respective cells that are overlapped by the set. In this case the data that was in each of the overlapped cells is lost. There is no means provided for grouping cells and displaying their logical manipulation in a meaningful way to the user.

Unfortunately, however, these software packages do not provide the user with the capability of performing a visual logical manipulation of groups with respect to their associated boundaries. That is, in conventional graphics software packages, groups are defined, undefined, or segmented as static entities. A particular group's associated boundary has no logic tied into it, i.e. it simply defines what objects are in the group, there is no accounting for interaction of an object, a set of objects, or another group with the associated boundary.

What is needed therefore is improved technology for logically grouping distinct entities, such as, for example, objects, cells, or elements, in a graphical user interface.

SUMMARY OF THE INVENTION

The invention provides an apparatus, method, and computer program product for segmenting sets of distinct entities into groups with associated boundaries each having an associated logic. As a method for logically segmenting a plurality of objects in a graphical user interface, a first set is selected from the plurality of objects which is defined a first group with a first associated boundary. The first group is modified in response to moving a selected entity across said first associated boundary where the selected entity is an object, a second set, a second group, a plurality of groups, and combinations thereof within the plurality of objects.

In another embodiment, an apparatus includes a means for selecting a first set from the list of elements, a means for defining the first set as a first group of contiguous elements with a first associated boundary having a first upper limit and a first lower limit; and a means for modifying the first group in response to moving a selected entity across said first associated boundary. In the described embodiment, the selected entity is an element, a second set, a second group, a plurality of groups, and combinations thereof within the list of elements.

These and other features and advantages of the present invention will be described in more detail below with reference to the associated figures.

BRIEF DESCRIPTION OF THE DRAWINGS

The following detailed description can be more fully understood when considered in conjunction with the following drawings.

DETAILED DESCRIPTION OF SELECTED EMBODIMENTS

Figure 1A:
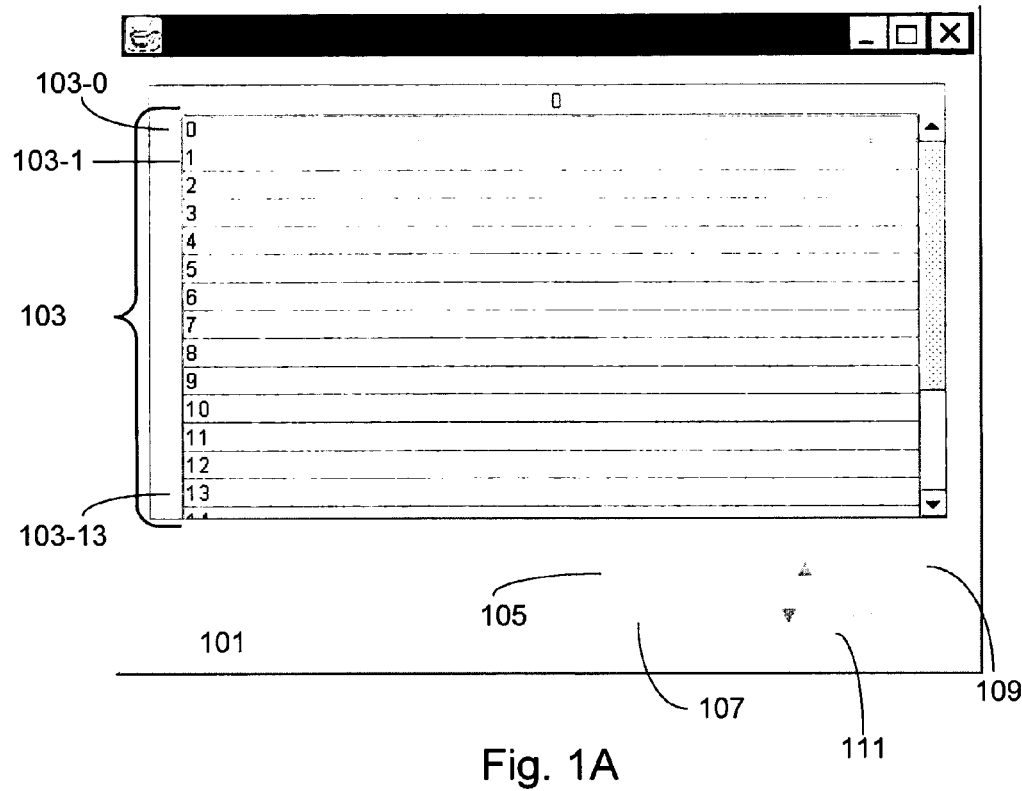
FIGS. 1A-1R are screen shots depicting various logical segmentation functions of one embodiment of the invention.

In the following detailed description of the present invention, numerous specific embodiments are set forth in order to provide a thorough understanding of the invention. However, as will be apparent to those skilled in the art, the present invention may be practiced without these specific details or by using alternate elements or processes. In some descriptions herein, well-known processes, procedures, and components have not been described in detail so as not to unnecessarily obscure aspects of the present invention.

A short description of the terminology used herein is presented for better understanding the description of the invention.

An entity as the term is used refers to something that is indivisible such as an element of a list (as in a spreadsheet or other list-related GUI). For the purposes of describing the invention, a selected element, or elements, group or set of groups, and combinations thereof are referred to as a selected entity. That is, in the invention, once any of the aforementioned is selected (for example distinguishing visually by highlighting or shading), then it is treated as a unit for the purposes of movement and logic associated with the invention.

Also included in the logic of the invention are grouping and ungrouping functions. In this context, a selected entity is defined as a group with a grouping function and that group is given an associated boundary. Whenever an ungrouping function is used, a group is said to have been undefined, and its associated boundary is removed. Broadly speaking, the invention provides an apparatus, method, and computer program product for segmenting sets of distinct entities into groups with associated boundaries each having an associated logic. The interaction of an object, a set of objects, another group, or combinations thereof with a group's associated boundary is accounted for by the logic of the invention such that the group and its associated boundary are modified with respect to the interaction.

Generally, the invention relates to any GUI where a set of objects is to be logically manipulated. For the purposes of clarity however, the invention will be described in terms of a specific embodiment, namely a GUI for logical segmentation of lists.

In one embodiment, the invention implemented as a method for logically segmenting a plurality of objects in a graphical user interface by selecting a first set from the plurality of objects, defining the first set as a first group with a first associated boundary, and modifying the first group in response to moving a selected entity across said first associated boundary. The selected entity is an object, a second set, a second group, a plurality of groups, and combinations thereof within the plurality of objects. In this context, movement across a boundary occurs when any part of the selected entity is moved across the first associated boundary in a direction from outside the first group to within the first group, or from within the first group to outside of the first group. Visually this movement can be represented, for example, by the entire area of an object having fully passed over a boundary. Alternatively, this movement can be represented by any finite portion of the area of an object or another group's boundary coming in contact with another boundary which is being crossed. This movement is preferably actuated using a drag and drop function, a user friendly tool in graphics software.

Logic of the invention dictates that a group is modified when any such boundary crossing takes place by a selected entity as described. Preferably this modification is an addition or subtraction of objects in the entity to or from the group, depending on if the selected entity moves into the group or out of the group. For instance if movement across a first associated boundary of a first group is from outside a boundary to within, then the logic modifies the first group by adding all objects of the selected entity which are not already part of the first group to the first group; and expanding said first associated boundary to include all objects of the selected entity which were not already part of the first group. Alternatively, if the movement of a selected entity across a first group's associated boundary occurs from within the group to outside the group, then the logic modifies the group by subtracting all objects of the selected entity which are not already part of the first group from the first group; and contracting said first associated boundary to include only those objects remaining in the first group. As part of the logic, groups are moved as a whole, including their associated boundaries, when all objects in the group are contained in a selected entity, and the entity is moved.

The above mentioned logical segmentations and group manipulations are just a few example embodiments of the invention. Also included in the logic of the invention are many more specific methods of modification of groups corresponding to movement across their associated boundaries. In the case of addition of objects from a selected entity into a group, not only does the logic dictate how the group is modified in response to movement across its associated boundary, but also how any groups contained in the selected entity are modified. For example if a selected entity, itself containing a second group in its entirety, is moved into a first group by crossing the first group's associated boundary, then logic of the invention undefines the second group contained within the selected entity by removal of its associated boundary. If the selected entity contains (as part of its selected objects) a subset of a second group, then the logic subtracts the subset from the second group, and contracts the second group's associated boundary to include only those objects remaining in the second group. This logic also applies to any plurality of groups within the selected entity as well.

Paralleling the above graphics software embodiments of the invention is a spreadsheet or list logic GUI embodiment that pertains to a method for logically segmenting a list of elements in a graphical user interface. In this embodiment, a first set is selected from the list of elements and is defined as a first group of contiguous elements with a first associated boundary having a first upper limit and a first lower limit. The first group is then modified in response to moving a selected entity across said first associated boundary. It should be noted that the selected entity is an element, a second set, a second group, a plurality of groups, and combinations thereof within the list of elements. In this context, movement across a boundary occurs when any part of the selected entity is moved across the first associated boundary in a direction from outside the first group to within the first group, or from within the first group to outside of the first group. More particular to lists of elements, movement across an associated boundary means crossing the first upper limit or the first lower limit. In one embodiment, brackets are used to denote the upper and lower limits of a particular boundary. In another embodiment, graphical icons are used in conjunction with boundaries to denote groups. In this case, selecting an icon also selects a group.

Movement of entities can be represented, for example, by the entire area of an element (for instance a cell in a spreadsheet) having fully passed over a boundary. Alternatively, this movement can be represented by any finite portion of the area of an element or another group's boundary coming in contact with another boundary which is being crossed. This movement is preferably actuated using a drag and drop function, although it is not necessary. In a particular embodiment, this crossing movement is not visually denoted, but rather the result of the transition is displayed.

Logic of the invention dictates that a group is modified when any such boundary crossing takes place by a selected entity as described. Preferably this modification is an addition or subtraction of elements in the entity to or from the group of contiguous elements, depending on if the selected entity moves into the group or out of the group. For instance if movement across a first associated boundary of a first group is from outside a boundary to within (across either an upper or lower limit), then the logic modifies the first group by adding all elements of the selected entity which are not already part of the first group to the first group; and expanding said first associated boundary to include all elements of the selected entity which were not already part of the first group. Alternatively, if the movement of a selected entity across a first group's associated boundary occurs from within the group to outside the group, then the logic modifies the group by subtracting all elements of the selected entity which are not already part of the first group from the first group. In addition, the first associated boundary is contracted in such a way as to include only those elements remaining in the first group. As part of the logic, groups are moved as a whole, including their associated boundaries, when all elements in the group are contained in a selected entity, and the entity is moved.

In the case of addition of elements from a selected entity into a group, again the logic dictates not only how the group is modified in response to movement across its associated boundary, but also how any groups contained in the selected entity are modified. For example if a selected entity, itself containing a second group in its entirety, is moved into a first group by crossing the first group's associated boundary, then logic of the invention undefines the second group contained within the selected entity by removal of its associated boundary. If the selected entity contains (as part of its selected elements) a subset of a second group, then the logic subtracts the subset from the second group, and contracts the second group's associated boundary to include only those elements remaining in the second group. This logic also applies to any plurality of groups within the selected entity as well.

In a particular method, only contiguous elements can be selected by the user. In this case, moving a selected entity within a list of elements occurs with one-element shift increments, only when the entity is not crossing any group's associated boundary. Thus, when an entity is moved once, any adjacent element is displaced in favor of the selected entity to a position on the opposite side of the selected entity, when the selected entity is moved toward said adjacent element. When an entity is adjacent to a group's associated boundary (either within the group or outside of the group) movement of the entity across the boundary is indicated by expanding or contracting the boundary and not actually moving the entity. This expansion or contraction corresponds to addition or subtraction of elements of the entity to or from the group, respectively. In one embodiment, a group is defined as having at least two elements, therefore when only one element would remain as a result of manipulation logic, then the group is undefined by removal of its associated boundary.

Included in the methods for logically segmenting lists of elements in a GUI are grouping and ungrouping functions. These functions generally relate to selecting elements of a list and defining them as groups ("grouping") or undefining groups or portions of groups ("ungrouping") and the logic associated with these manipulations. Given the description above for grouping a selected set of elements from a list of elements into a first group with an associated boundary, further description of grouping and ungrouping functions are perhaps best described in relational terms between the first group and a second group or plurality of groups. That is, what happens when grouping or ungrouping functions are applied to existing groups. In this description, the reference point will be the first group having been already defined as described above.

First grouping methods will be described. One method comprises selecting a second set from the list of elements that is distinct from the first set and defining the second set as a second group with a second associated boundary having a second upper limit and a second lower limit. The first group is redefined when any elements of the second set are common to the first group. Further embodiments describe methods based on this redefining in those cases where only contiguous elements can be selected. In one embodiment, redefining the first group includes removing the first associated boundary, bisecting the first group (only when the second set was not adjacent to either the first upper limit or the first lower limit) and defining each of the two sets of remaining contiguous elements resulting from bisection of the first group, above and below the second group, as new groups with associated boundaries. In another embodiment, redefining the first group includes truncating the first group by removal of a subset of elements of the second set which are common to the first group and which are adjacent to either the first upper limit or the first lower limit and realigning whichever of the first upper limit or the first lower limit that the subset was adjacent to, so that the first associated boundary encompasses only those elements remaining in the first group. In yet another embodiment, redefining the first group comprises undefining the first group by removing the first associated boundary when the second set contains all elements of the first group. The second set may include elements from other groups, therefore the grouping functions as just described in terms of the second set extend to redefining any of a plurality of groups, which also have elements common to the second set, in the same manner as described for the first group.

Ungrouping methods are described in terms of what happens to the first group when a set of elements contains some elements of the first group and an ungrouping function is applied. One method comprises: selecting the second set from the list of elements; and redefining the first group so that the subset of elements of the second set which are common to the first group are no longer included in the first group. Further embodiments described comprise methods based on this redefining, but wherein only contiguous elements can be selected. In one embodiment, redefining the first group includes removing the first associated boundary, bisecting the first group only when the second set was not adjacent to either the first upper limit or the first lower limit, and defining each of the two sets of remaining contiguous elements resulting from bisection of the first group, above and below the second set, as new groups with associated boundaries.

In another embodiment, redefining the first group includes truncating the first group by removal of a subset of elements of the second set which are common to the first group and which are adjacent to either the first upper limit or the first lower limit and realigning whichever of the first upper limit or the first lower limit that the subset was adjacent to, so that the first associated boundary encompasses only those elements remaining in the first group. In yet another embodiment, redefining the first group comprises undefining the first group when the second set contains all the elements of the first group. Again, the second set may include elements from other groups, therefore the ungrouping functions as just described in terms of the second set extend to redefining any of a plurality of groups, which also have elements common to the second set, in the same manner as described for the first group.

The invention will now be described in terms of a graphical user interface having a list of elements. It should be noted, however, that the invention is suitable for any situation where grouping and ungrouping elements in a graphically based computing environment is desired.

Figure 1B:
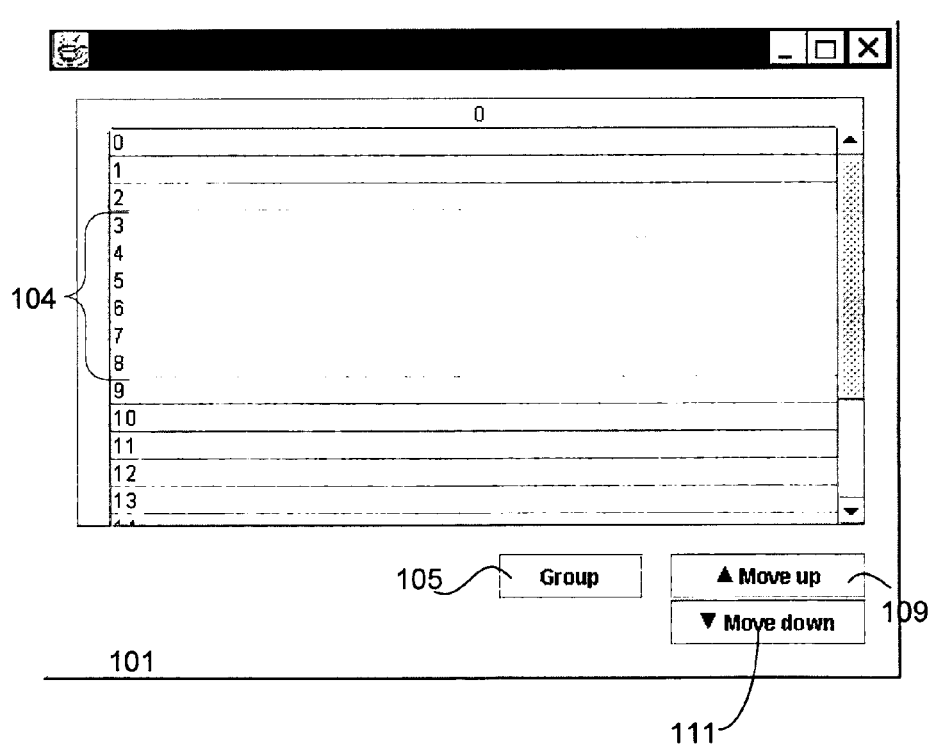
Figure 1C:
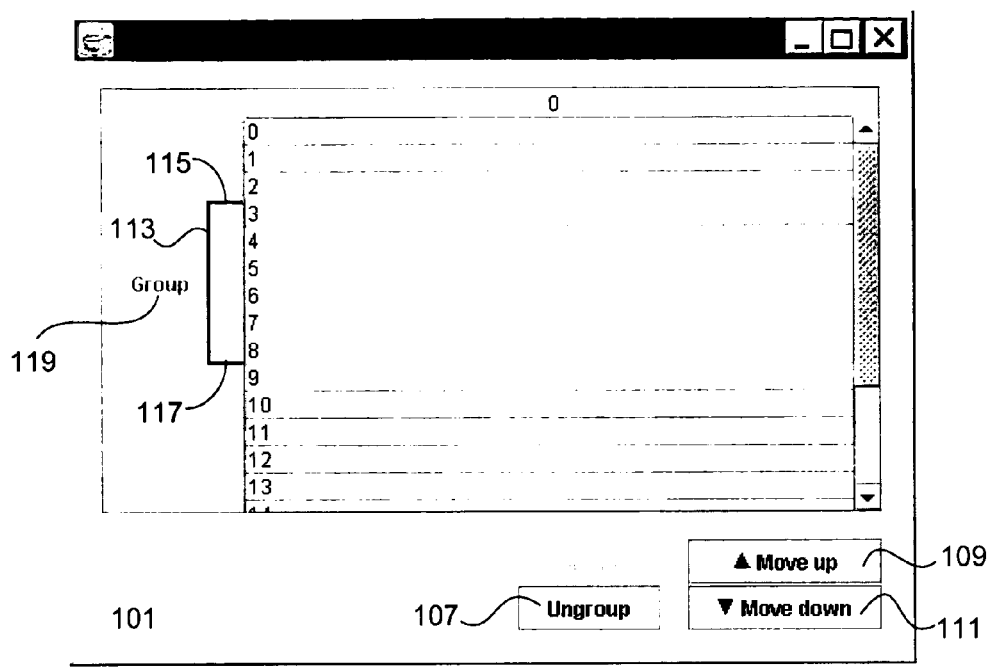
Figure 1D:
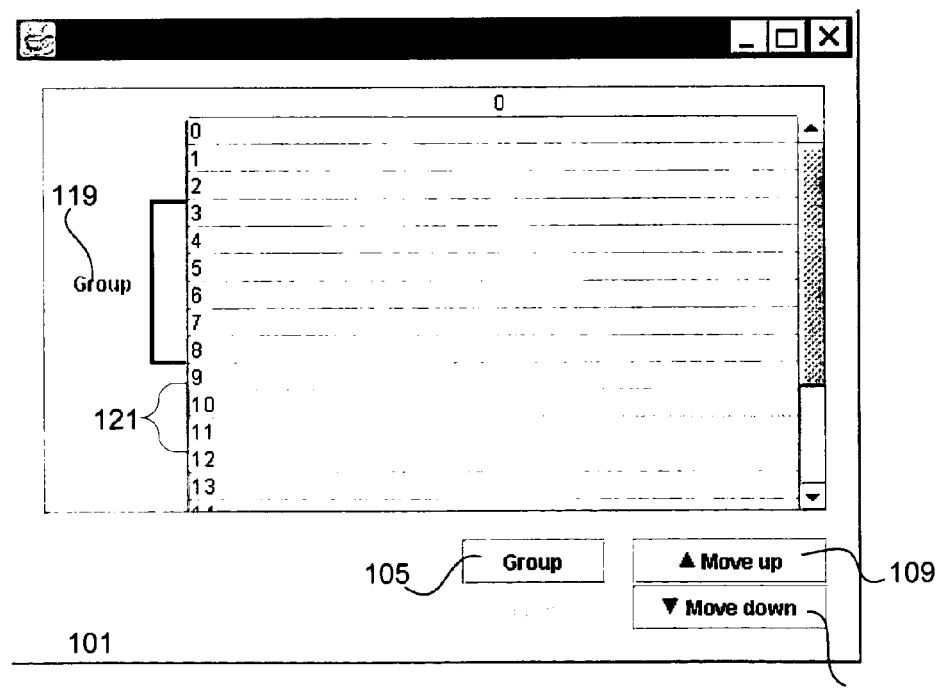
Figure 1E:
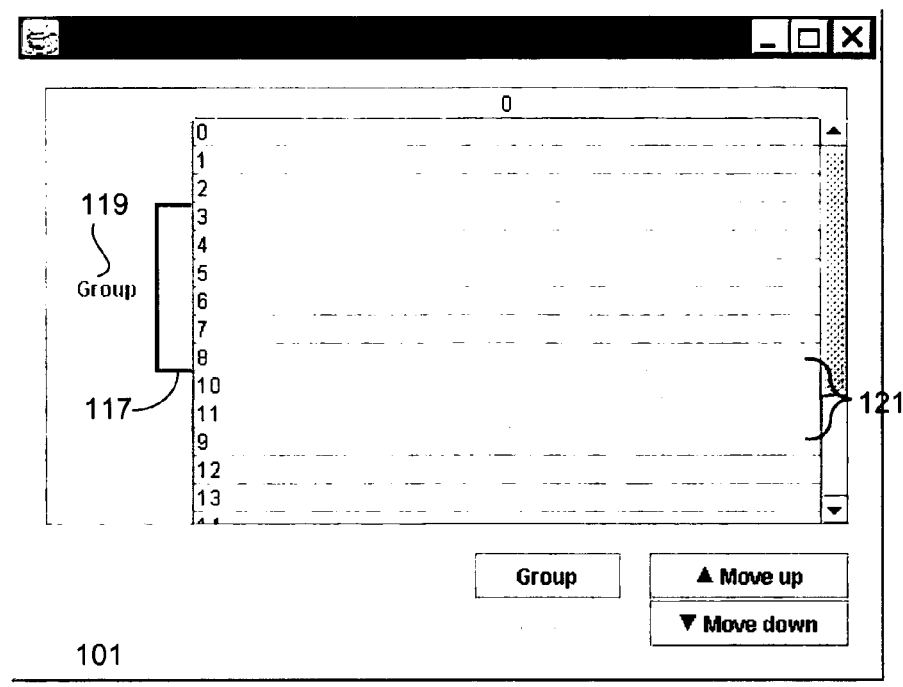
Figure 1F:
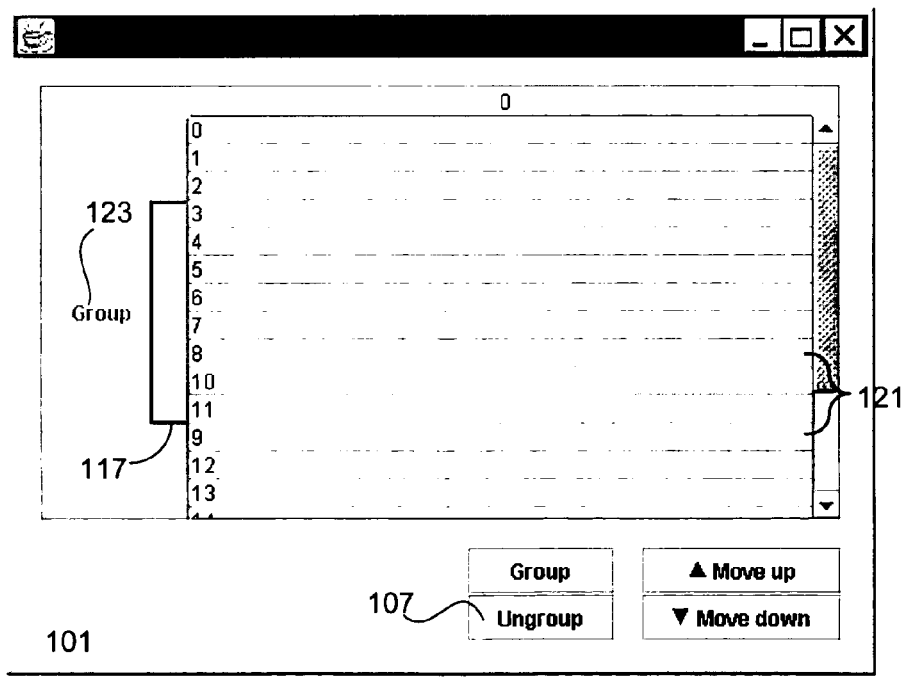
Figure 1G:
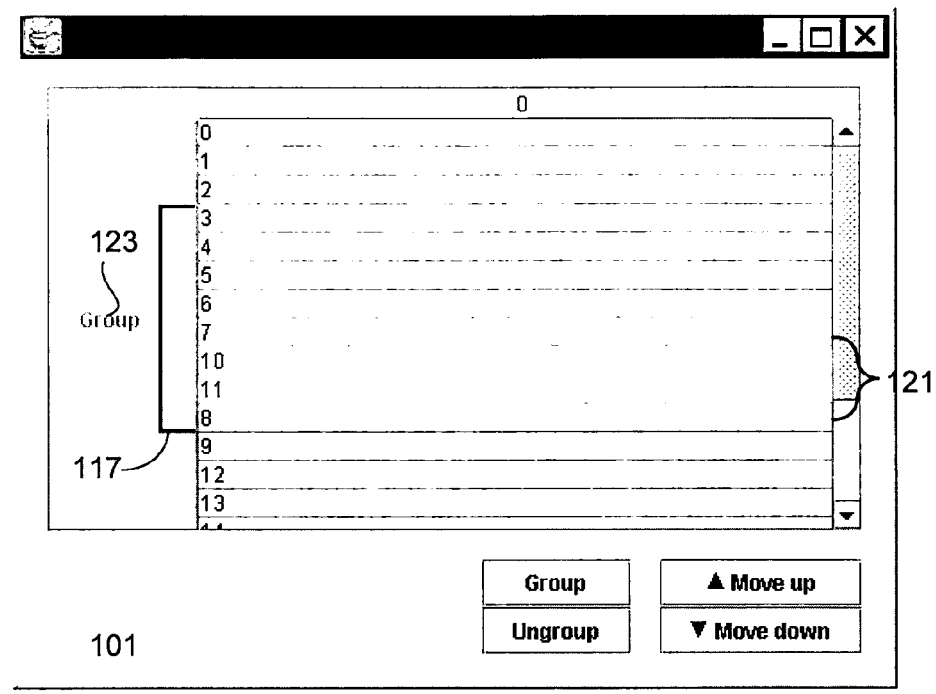
Figure 1H:
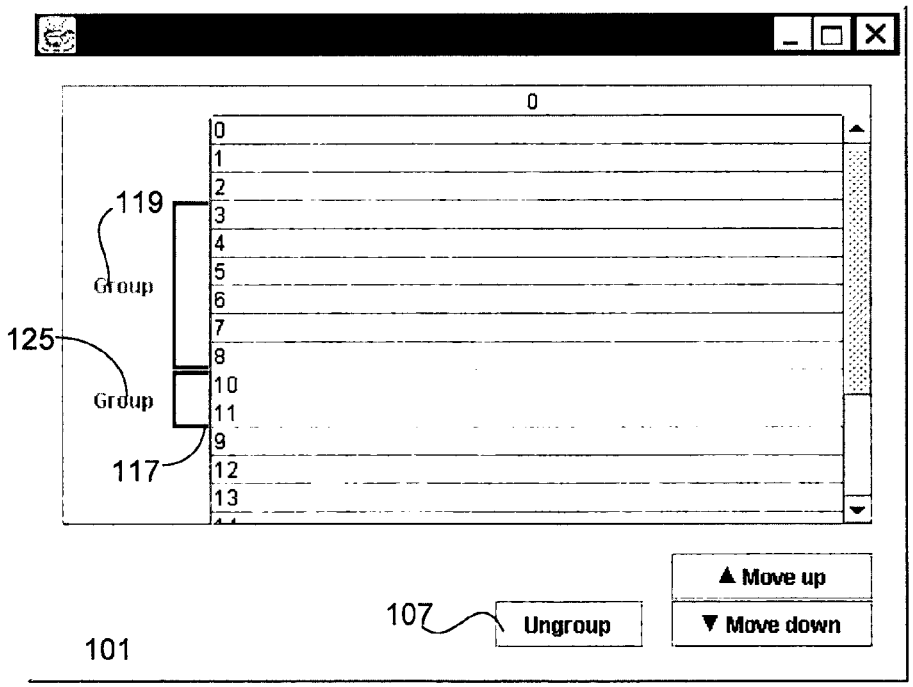
Figure 1I:
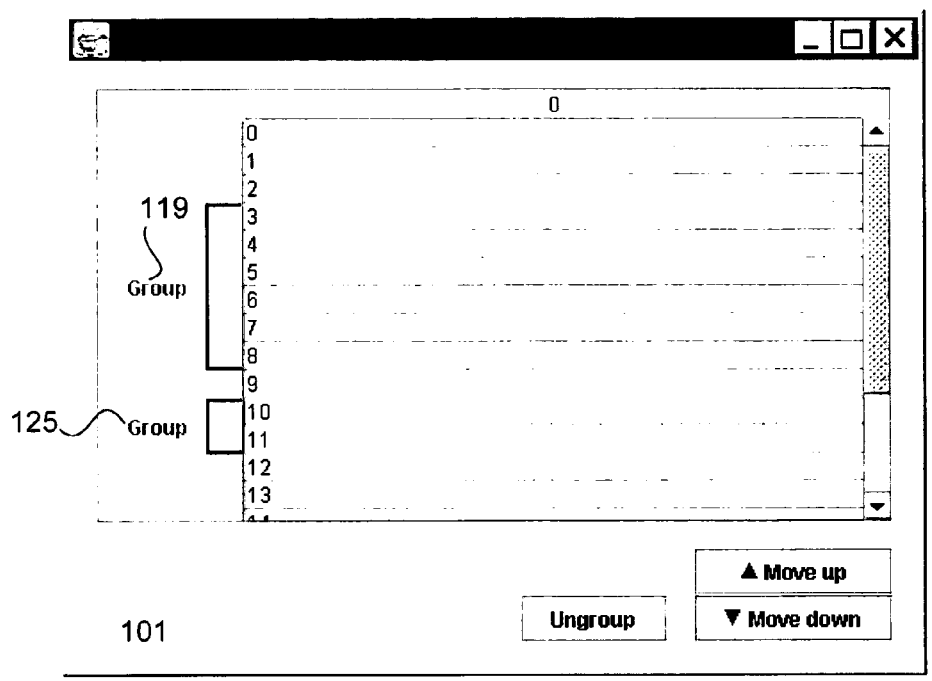
Figure 1J:
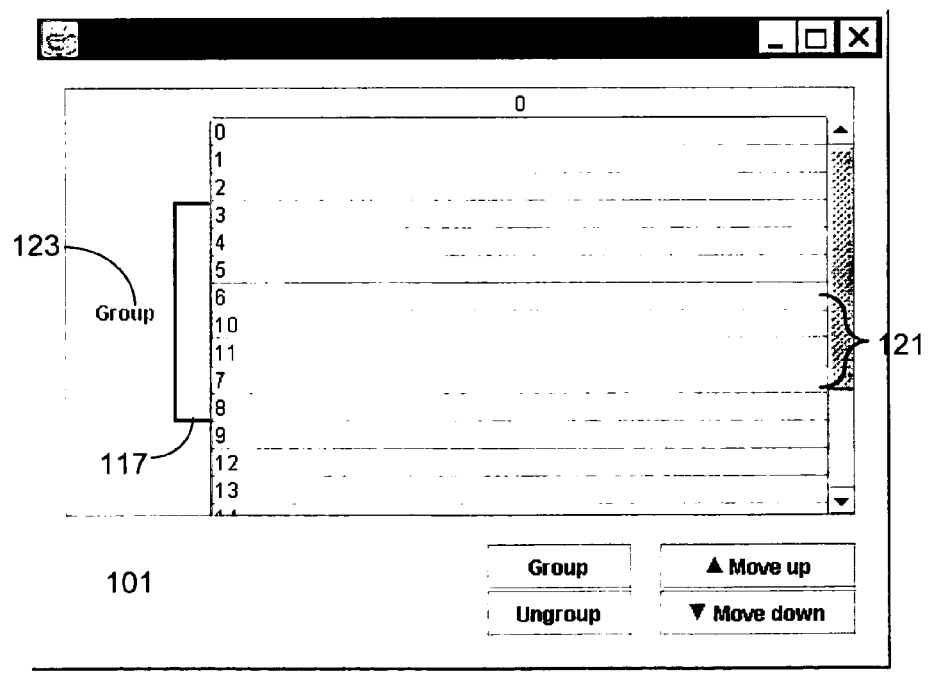
Figure 1K:
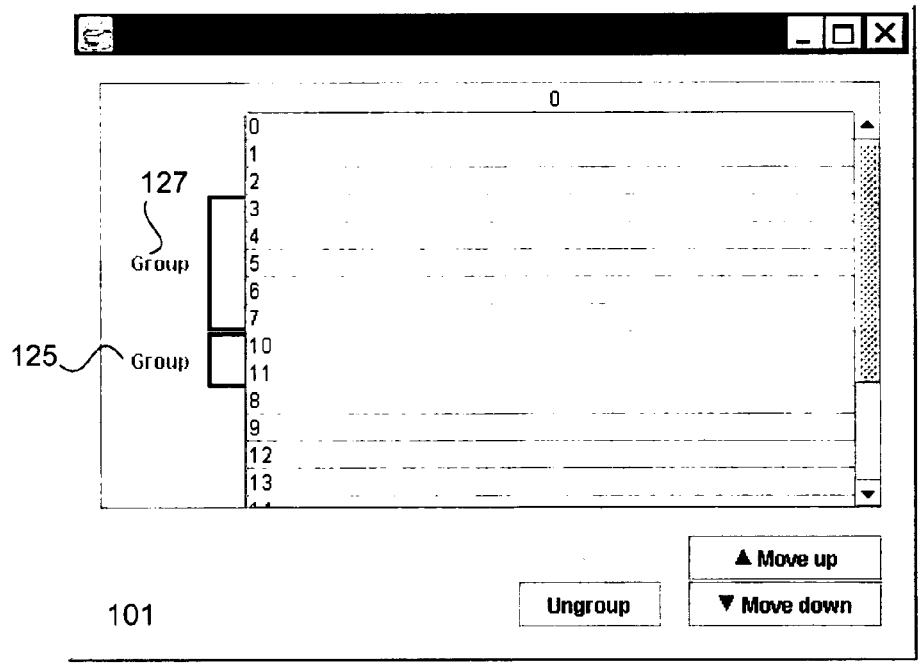
Figure 1L:
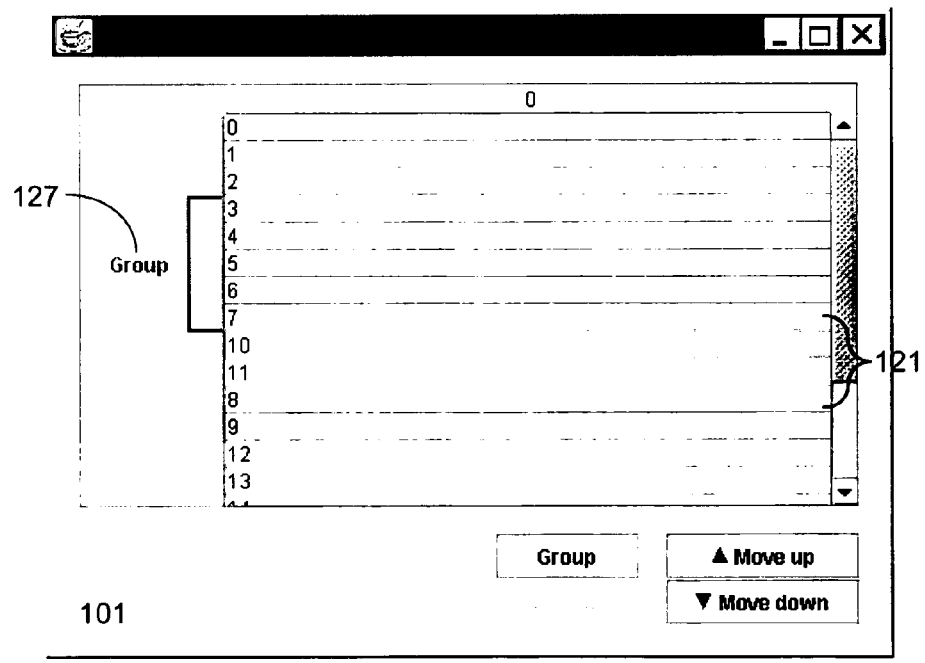
Figure 1M:
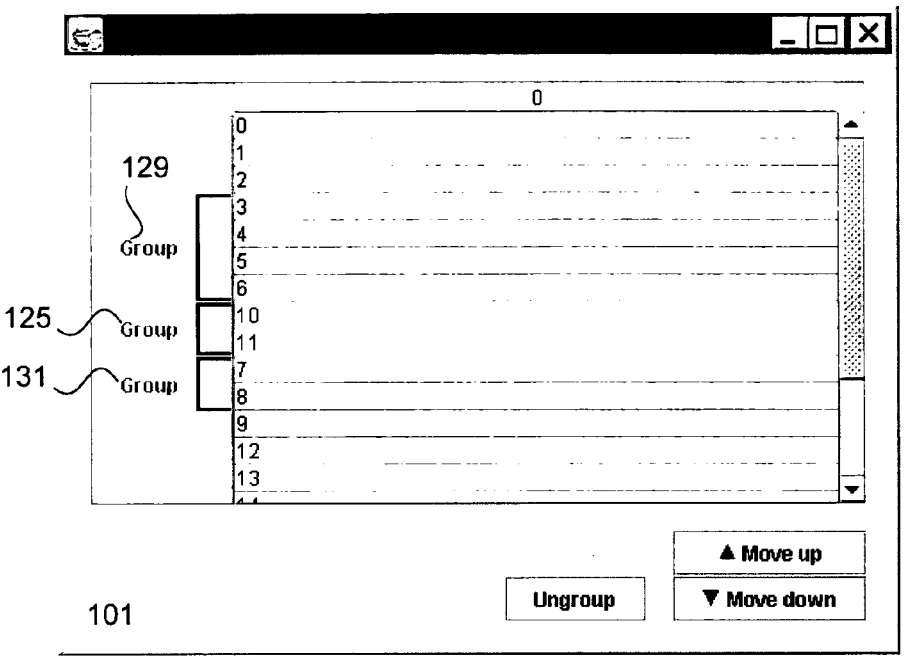
Figure 1N:
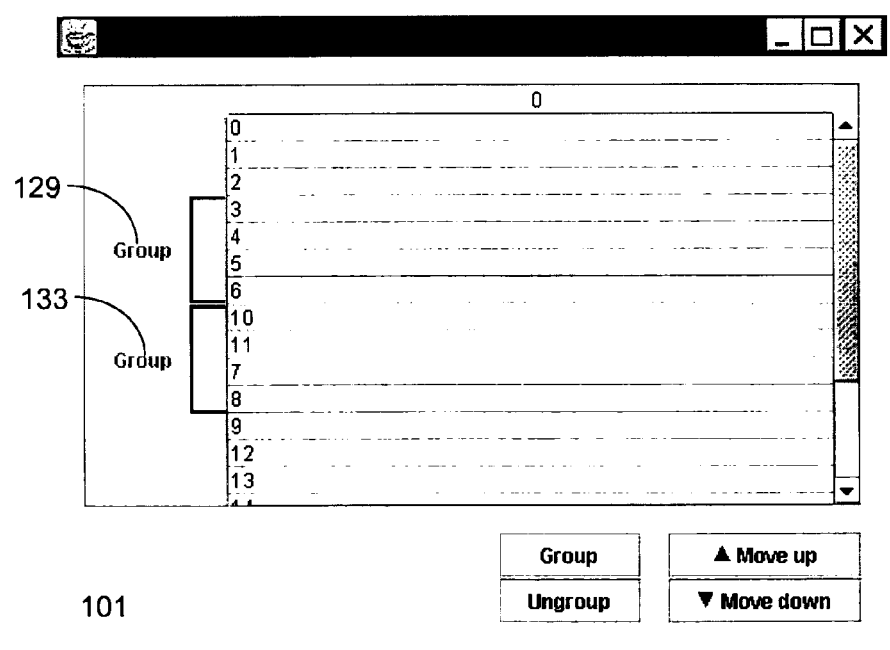
Figure 1O:
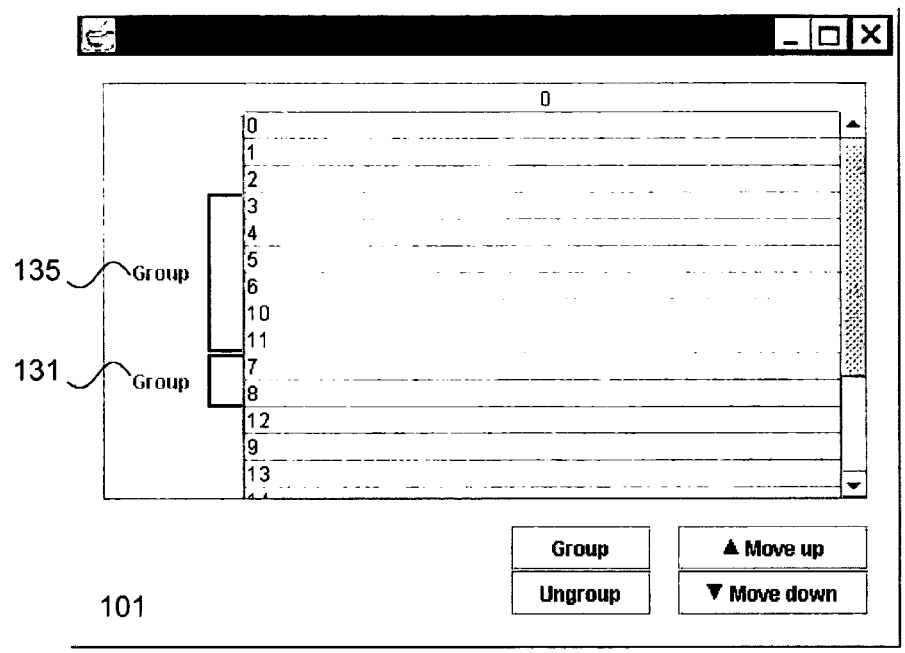
Figure 1P:
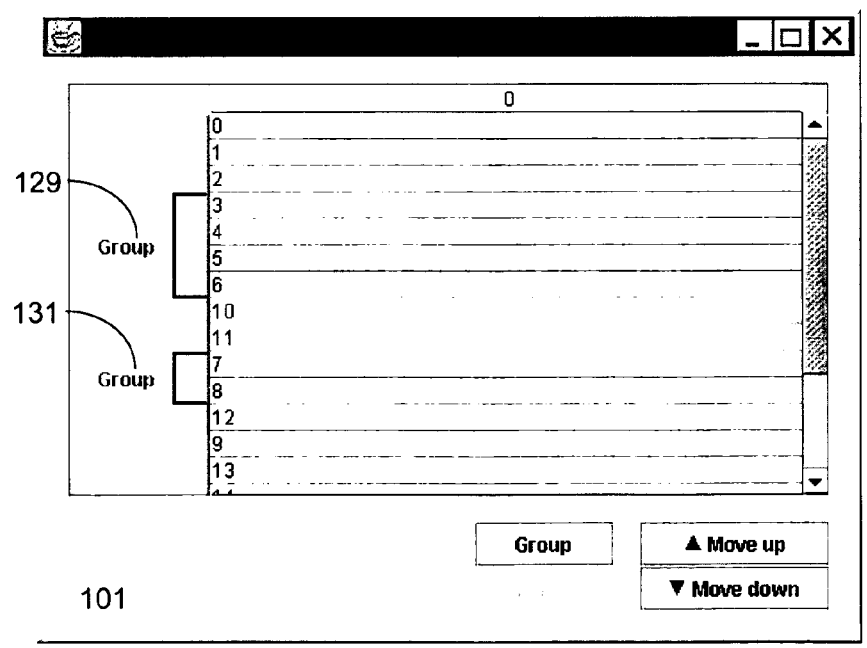
Figure 1Q:
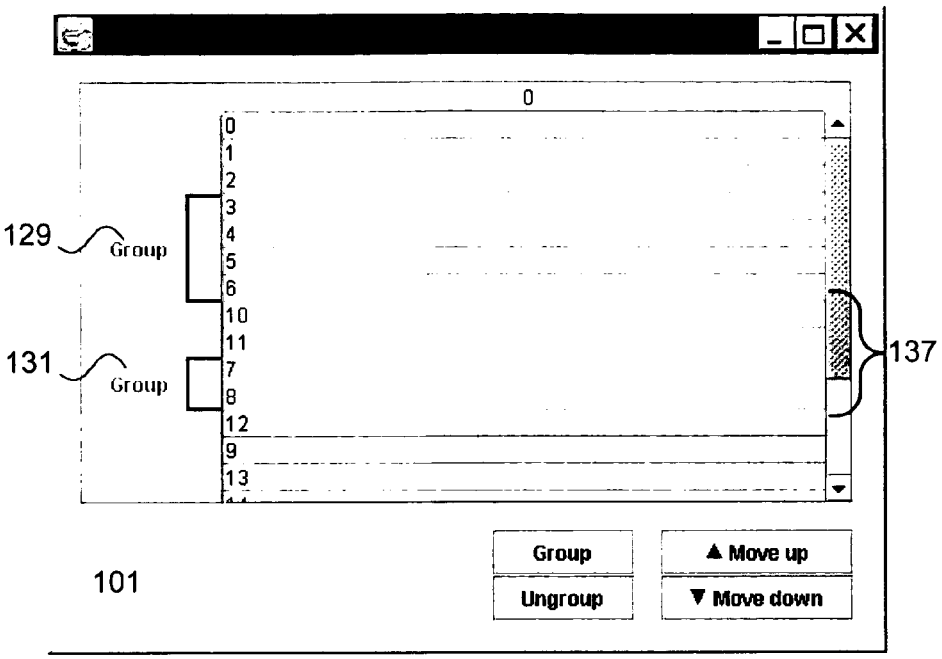
Figure 1R:
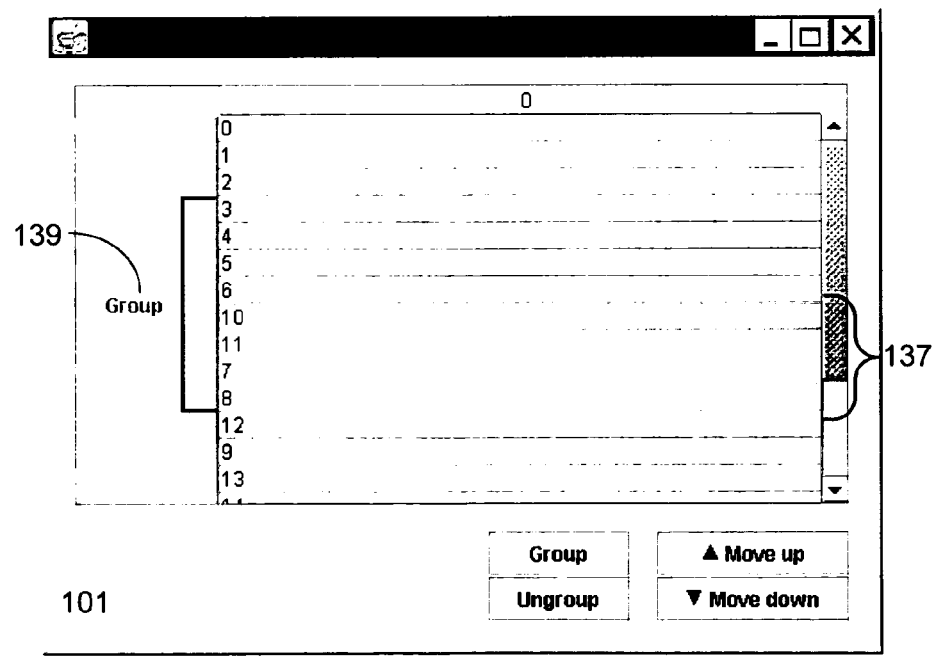

FIGS. 1A-1R are screen shots of a various configurations of a graphical user interface (GUI) 101 depicting various logical segmentation functions in accordance with an embodiment of the invention. FIG. 1A shows a screen shot of the GUI 101 where a list (or table) of elements 103 is displayed. List 103 includes a set of elements 103-0 through 103-13. Note that there are a number of button graphics, such as one for grouping (105), one for ungrouping (107); one for moving a selection up within the list (109); and one for moving a selection down within the list (111); respectively. In this case, since no elements are selected, none of the button graphics are highlighted. For the purposes of this discussion, when a set of elements from list 103 is selected it is called a selected entity. Also for this particular embodiment, only contiguous elements can be selected, only one entity can be selected at one time, only one-element shift movements are possible for any selected entity, and a group must contain a minimum of two elements; that is, a single element may not be defined as a group with an associated boundary.

FIG. 1B shows a first selected entity 104 consisting of numbered elements 103-3 through 103-8. It should be noted that sets of elements are selected by a standard drop and drag movement. Note that "group" button 105 is now highlighted, as well as buttons 109 and 111 for moving the currently selected entity 104. If the group button 105 is struck (or clicked), then the selected entity 104 is defined as a group with an associated boundary and graphic to the left of the boundary (denoted "group" in this case), as depicted in FIG. 1C. The first selected entity now is defined as group 119, with an associated boundary 113. The selected entity remains selected after the grouping function. Also, the "group" graphic to the left of the boundary 113 can be used to select the entire group (all elements of) to which it corresponds by clicking on the icon itself. In this embodiment, the boundary 113 is a bracket, although those skilled in the art would understand that any graphic could be used to represent an associated boundary, for instance closed boundary such as a box in which boundary 113 has associated with it an upper limit 115 and a lower limit 117. When any entity is moved across either the upper or lower limits of a boundary from within a group to outside the group or from outside a group to within the group, that is referred to as crossing the boundary. Note that once a group has been defined, group button 105 is no longer highlighted, but ungroup button 107 is now highlighted as well as movement buttons 109 and 111. This means that the user has options to ungroup the currently selected group, or move the group in either direction within list 103. From herein, the discussion will focus on manipulations that can be permutated from this point on.

For example, if the user now selects a new set of elements, a second entity, consisting of elements 10 and 11, the result is depicted in FIG. 1D. Note that group 119 is now deselected, button 105 is now highlighted and button 107 is no longer highlighted. Buttons 109 and 111 are highlighted as long as there is a selected entity in the list. New selected entity 121 is outside of group 119. If entity 121 is moved up once using button 109, the result is a one-element shift move as depicted in FIG. 1E. Note that element 9 which was above entity 121, is now below 121 above element 12, and entity 121 is now adjacent to lower limit 117 (also referred to in this description as "on the border" of a boundary). If entity 121 is moved up once, the result is depicted in FIG. 1F. The boundary associated with group 19 has now been expanded by moving lower limit 117 to encompass entity 121, and thus group 119 has been redefined, as group 123 which contains elements 103-8 and 103-10 through 103-11. Thus entity 121 did not actually move, but rather since it was on a group boundary and was being moved toward that boundary, the boundary was expanded. Note that button 107 is now highlighted, giving the user a choice to ungroup selected entity 121, that it is now part of group 123. If the user moves selected entity 121 up once more, then the result is just movement within group 123, as depicted in FIG. 1G. Each movement where a boundary is not being effected involves displacement of the element adjacent to the entity being moved to the side of the entity opposite the direction of movement.

Referring back to FIG. 1F, if the user moves entity 121 down once, then the boundary of group 123 is contracted to include only those elements not common to the entity before said movement, as depicted in FIG. 1E. In this case, group 119 is now redefined. Also referring to FIG. 1F, if the user chooses to ungroup selected entity 121 with button 107, then the result again is depicted in FIG. 1E.

Again referring back to FIG. 1F, if the user chooses to group entity 121, then another group, consisting of elements 103-10 and 103-11 is defined. Again the boundary of group 123 is contracted to include only those elements not common to the entity before said grouping, as depicted in FIG. 1H. Also again, group 119 is now redefined. Note that since all elements of a new group 125 are selected, only button 107 is available as a grouping function option.

In this embodiment, a selected group is moved as a whole. That is, a group's associated boundary and graphic are moved along with the elements of the group for continuity of movement. For example, referring to FIG. 1H, if the user moves group 125 up once, then since group 125 is adjacent to group 119, the boundary of group 125 will be removed, the boundary of group 119 will be expanded to include those elements in group 125, and a new group is defined. The result is depicted in FIG. 1F, thus group 123 is redefined. If the user moves group 125 down once, then since no boundaries will be effected, a simple displacement move is performed, as depicted in FIG. 1I.

Referring back to FIG. 1G, if entity 121 is moved up once, then as expected, simple movement within the group results, as depicted in FIG. 1J. Depicted in FIGS. 1G and 1J, are distinct scenarios. In FIG. 1G, selected entity 121 has only one element between it and lower limit 117. In FIG. 1J, selected entity 121 has two elements between it and lower limit 117. Since a group must contain at least two elements, different results arise from performing a grouping function from these two starting points. Referring to FIG. 1G, if selected entity 121 is grouped, then group 123 is undefined, and two new groups are defined, as depicted in FIG. 1K. In this case since the contiguous elements above selected entity 121 (elements 3-7) that were originally part of group 123 number at least two, then they are defined as new group 127. But since the element below selected entity 121 (element 8) that was originally part of group 123 numbers only one, then it is undefined and no longer belongs to any group. Again referring to FIG. 1G, if selected entity 121 is ungrouped, then group 123 is undefined, and only one new group is defined, as depicted in FIG. 1L. In this case since the contiguous elements above selected entity 121 (elements 3-7) that were originally part of group 123 number at least two, then they are defined as new group 127. Selected entity 121 is undefined, that is, it is removed from the group from which it was part. Since the element below selected entity 121 (element 8) that was originally part of group 123 numbers only one, then as before it is undefined and no longer belongs to any group.

Referring to FIG. 1J, if selected entity 121 is grouped, then group 123 is undefined, and three new groups are defined, as depicted in FIG. 1M. Since the contiguous elements above selected entity 121 (elements 3-6) that were originally part of group 123 number at least two, then they are defined as new group 129. And since the contiguous elements below selected entity 121 (elements 7-8) that were originally part of group 123 number at least two, then they are defined as new group 131. In this case, group 123 was bisected, and three new groups resulted.

Anytime a group boundary is crossed, the change effected is with reference to the group whose boundary is being crossed. Referring to FIG. 1M, if selected group 125 is moved down once, then since the boundary of group 131 is being crossed, then group 125 is undefined, and the boundary of group 131 is expanded to include those elements in that were in group 125, as depicted in FIG. 1N. In this case new group 133 is defined. Again, referring to FIG. 1M, if selected group 125 is moved up once, then since the boundary of group 129 is being crossed, then group 125 is undefined, and the boundary of group 129 is expanded to include those elements that were in group 125, as depicted in FIG. 1O. In this case, new group 135 is defined.

Once again referring to FIG. 1M, if group 125 is ungrouped, then its associated boundary is removed and thus it is undefined as a group, as depicted in FIG. 1P. Noteworthy, is that the result depicted in FIG. 1P can also be achieved starting from the scenario in FIG. 1J, and ungrouping selected entity 121.

Referring to FIG. 1P, if group 131 (containing elements 103-7 and 8) is selected along with elements 103-10 and 11, then the result is depicted in FIG. 1Q. A new selected entity, 137, consisting of elements 103-10 and 11, and group 131 is adjacent to group 129. When selected entity 137 is moved up once, then all of the elements in selected entity 137 become a part of the newly formed group resulting from crossing the boundary of group 129. This result is depicted in FIG. 1R. The end result is that the boundary of group 129 is expanded to encompass all elements of selected entity 137, and a new group, 139, is defined. The associated boundary of group 131 is removed as well. Thus when a selected entity contain a second group or multiple groups, and the selected entity is moved across a first group's boundary, then the first group's boundary is expanded to include all elements of the selected entity, thus defining a new group. And any groups contained within the selected entity lose their associated boundaries as a result.

The description of FIGS. 1A-1R illustrate the utility of an embodiment of the invention. Logic of the invention provides the user the ability to logically segment sets of objects or elements in a list, and manipulate the segments with the results of the manipulations accounted for by said logic. A more detailed description of the logic used for moving entities, crossing boundaries, as well as grouping and ungrouping functions as they relate to boundaries follows.

Figure 2A:
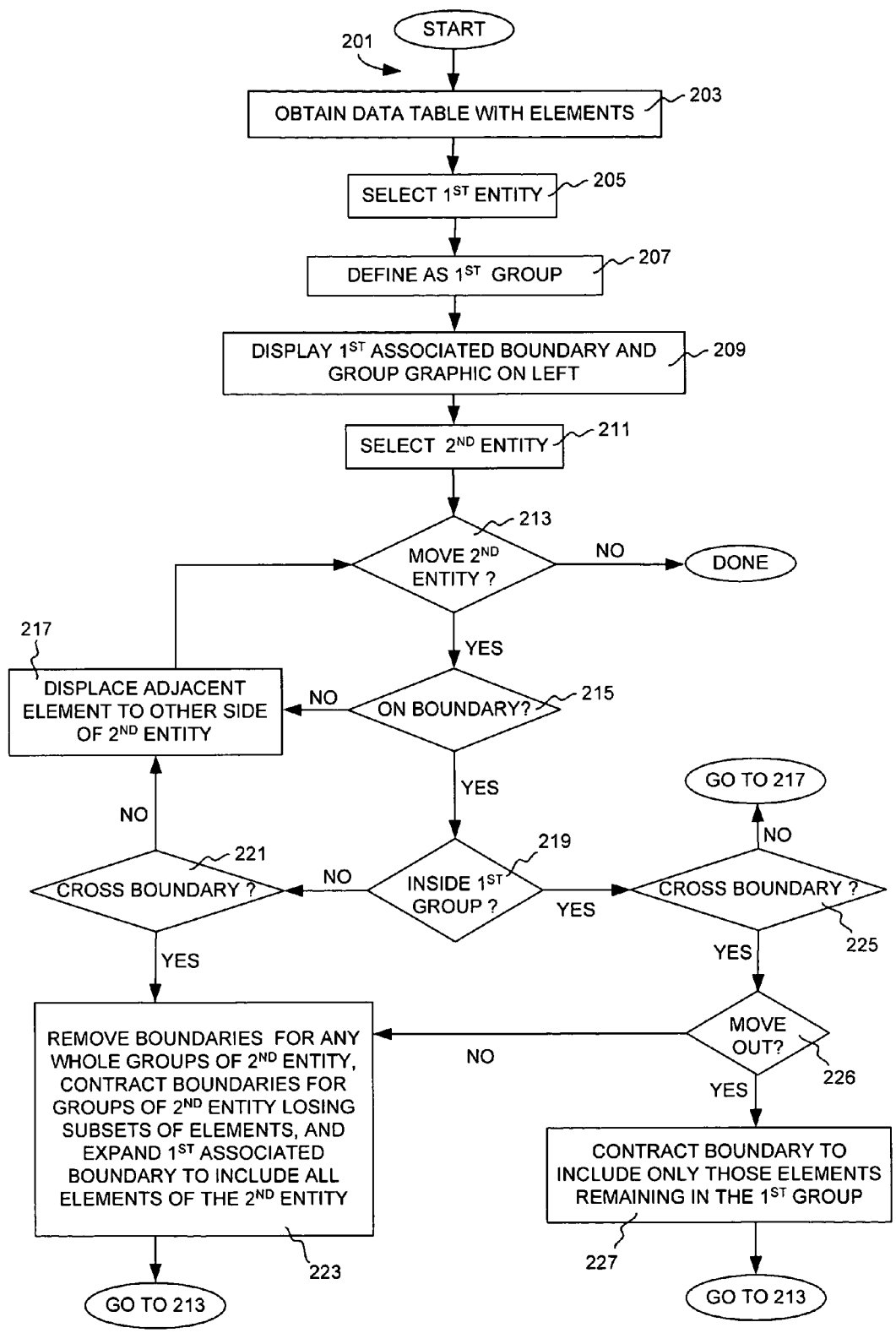
FIGS. 2A-2C are flowcharts describing logic for a list segmentation embodiment as described for FIGS. 1A-1R.
Figure 2B:
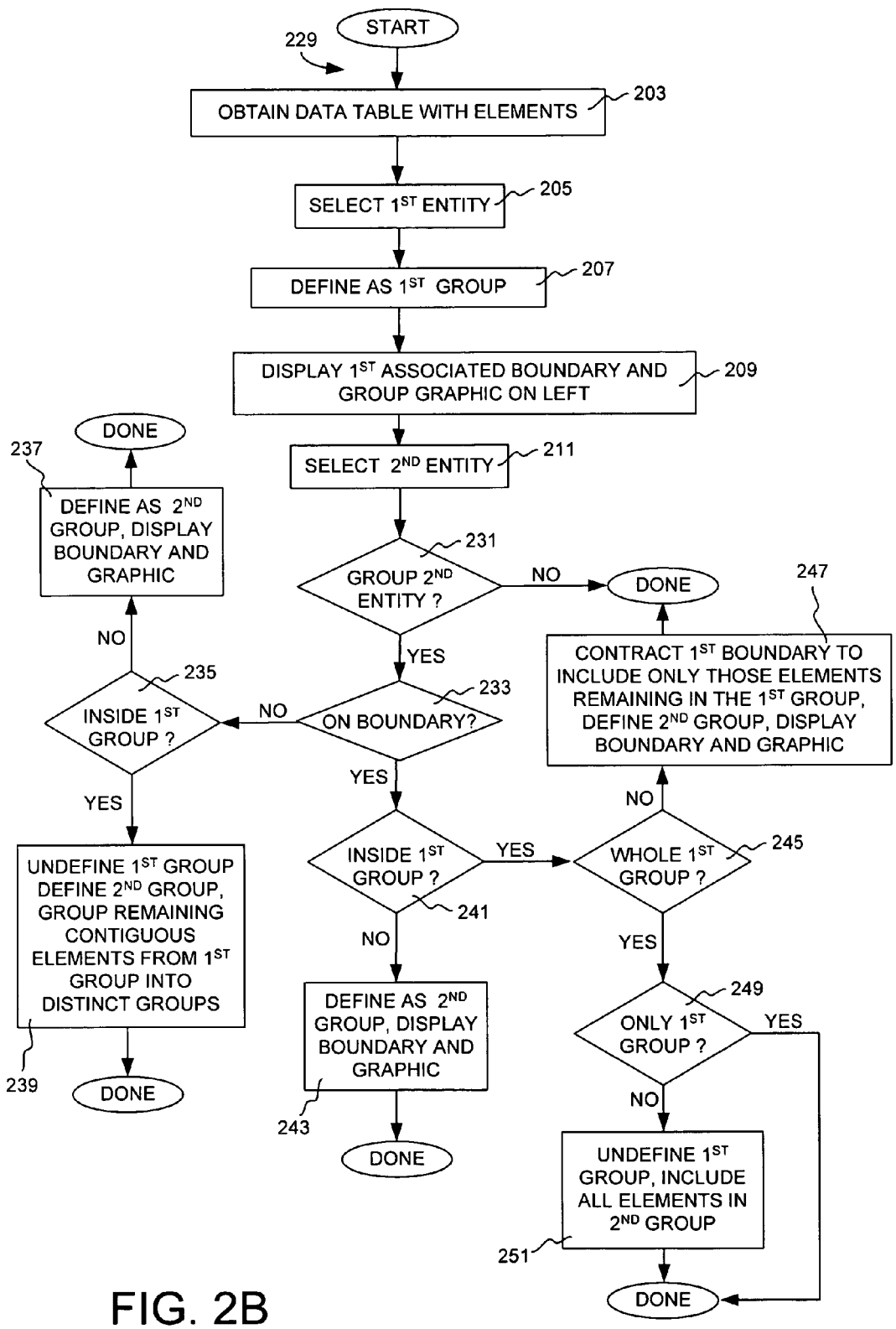
Figure 2C:
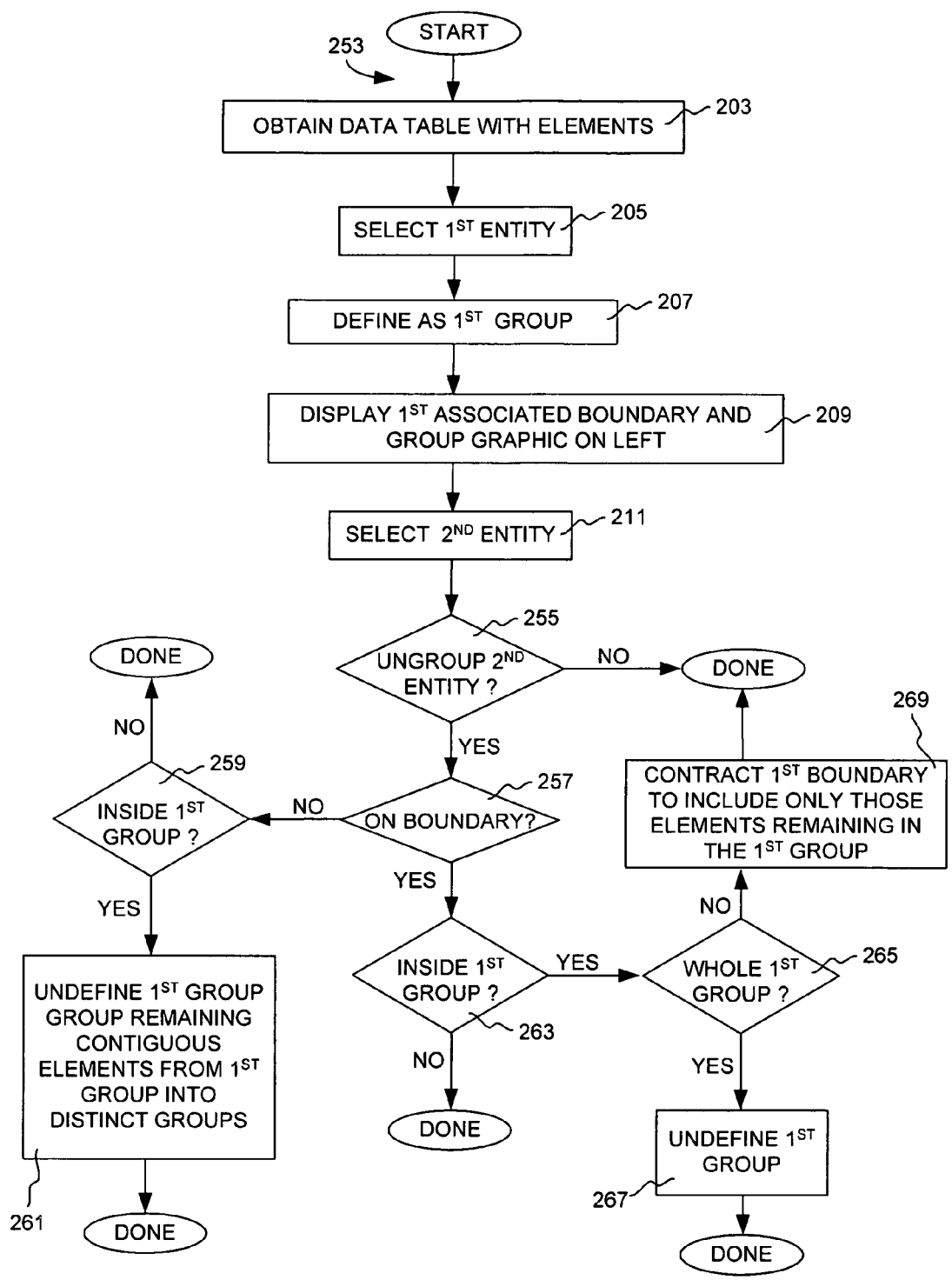

FIGS. 2A-2C are flowcharts describing logic for the list segmentation embodiment described for FIGS. 1A-1R. FIG. 2A depicts a method 201, for logic of the invention comprising defining groups and moving entities across boundaries of groups. For simplicity, logic associated with movement of a second entity relative to a first group is described. The logic applies to an element or elements in the selected entity as well as complex scenarios involving multiple groups that may be contained in the selected entity. First a data table or list of elements is obtained, see 203. Then a first entity is selected, 205. The first entity is defined as a group, see 207. Next, in 209, the first group's associated boundary is displayed. Optionally, a graphic can be displayed with the associated boundary, as described above. Next, a second entity is selected, see 211. Note, the logic accounts for the second selected entity being the same as the first entity or containing the first entity (now defined as the first group). Next, the decision is made as to whether the selected second entity is to be moved, see 213. If the user does not choose to move the second entity, then the logic is done, but if the user chooses to move the second entity, then another decision is made as to whether the second selected entity is adjacent to the first group's associated boundary, see 215. For the second selected entity to be adjacent, at least one of its elements must be adjacent to the first group's associated boundary, either inside, outside, or both. If the second selected entity is not adjacent to the first group's associated boundary, then the second entity is moved as described above, see 217. From there, the logic decides whether or not to move the entity again, see 213. As long as a selected entity is not adjacent to a group's associated boundary, then the simple one-element move as described in 217 will occur, i.e. 213-217.

Referring back to 215, if the second selected entity is adjacent to the first group's associated boundary, then another decision is made as to whether or any element of the selected entity is inside the boundary of the first group, see 219. If not, then another decision is made as to whether the direction of movement will result in a boundary crossing, see 221. If so, then the result is that the second entity is crossing the first group's associated boundary from outside to inside the first group. See 223. In this case, any whole groups that are a part of the second selected entity become a part of the first group and their associated boundaries are removed, effectively undefining those groups. Also, any elements of the second selected entity that are a subset of another group are removed from that group, and said group's associated boundary is contracted to contain only those elements remaining in that group. Finally, the first group's associated boundary is expanded to encompass all its original elements as well as all elements of the second selected entity. As depicted in FIGS. 1A-1R, the selected elements of the second entity remain selected (highlighted) after any function discussed herein, except choosing a new entity. This allows the user to continue manipulation steps on the selected entity until a new entity is desired. Referring back to 221, if the first associated boundary is not being crossed, then step 217 is repeated.

Referring back to step 219, if elements of the second entity are inside the first group, the situation is more complex. First, a decision is made as to whether the first associated boundary is being crossed, see 225. If not, then there exist two situations. One is that all of the elements of the first group are part of the second selected entity, and thus the group is moved as a whole as described above, see 217. The other is that a subset of elements is being moved within the first group. In the latter case, step 217 is repeated, however the displacement of elements upon moving the entity applies only to elements inside the group, as can be seen for example in the transition from FIG. 1F to FIG. 1G. Referring back to step 225, if the first associated boundary is being crossed, then another decision must be made, see 226. If the boundary crossing is from inside the first group to outside, then the first associated boundary is contracted to include only those elements remaining in the first group, see 227. Next, the logic returns to step 213. Referring back to step 226, if the boundary crossing is from outside to within the first group, then step 223 is repeated, that is all elements of the second entity are combined with those of the first group. Since there were elements of the second selected entity common to the first group, those elements remain as part of the newly expanded group. Once step 223 is complete, then step 213 is repeated. The movement logic of the invention allows the user to move a selected entity up or down within a list, into or out of groups, and accounts for interaction of the entity with said groups.

FIG. 2B depicts a method 229, for the list segmentation embodiment of the invention comprising grouping functions. In this case, steps 203-211 are the same; a first selected entity is defined as a first group having an associated boundary and a second entity is selected. Next, a decision is made as to whether to group the second entity, see 231. If not, the logic is done. If so, then another decision is made as to whether the selected entity is on the boundary of the first group, see 233. If not, then another decision is made as to whether any element of the second selected entity is inside the first group, see 235. If not, then the second entity is defined as a second group and the logic is done, see 237. If so, then the first group is undefined, the second group is defined (with an associated boundary), any contiguous elements on either side of the second group are defined as new groups, and the logic is done, see 239. This transformation is depicted in FIGS. 1J and 1M, respectively.

Referring back to 233, if the second selected entity is on the boundary of the first group, then another decision is made as to whether any elements of the entity are inside the first group, see 241. If not, then the second entity is defined as the second group and the logic is done, see 243. If so, then another decision is made as to whether the whole first group is contained within the second selected entity, see 245. If not, then the first group's associated boundary is contracted to encompass only those elements not common to the second selected entity, the second group is defined, and the logic is done, see 247. Referring back to 245, if the first group is fully contained within the selected second entity, then another decision is made as to whether only the first group makes up the second selected entity, see 249. If so, then the logic is done, because that selection defines the first group and no further grouping is needed. If not, then the second entity contains more than the first group's elements, so the first group is undefined, and the second group is defined, see 251.

FIG. 2C depicts a method 253, for the list segmentation embodiment of the invention comprising ungrouping functions. In this case, steps 203-211 are the same; a first selected entity is defined as a first group having an associated boundary and a second entity is selected. Next, a decision is made as to whether to ungroup the second entity, see 255. If not, the logic is done. If so, then another decision is made as to whether the selected entity is on the boundary of the first group, see 257. If not, then another decision is made as to whether any element of the second selected entity is inside the first group, see 259. If not, the logic is done. If so, then the first group is undefined, any contiguous elements on either side of the second group are defined as new groups, and the logic is done, see 261. This transformation is depicted in FIGS. 1J and 1P, respectively.

Referring back to 257, if the second selected entity is on the boundary of the first group, then another decision is made as to whether any elements of the entity are inside the first group, see 263. If not, the logic is done. If so, then another decision is made as to whether the whole first group is contained within the second selected entity, see 265. If not, then the first group's associated boundary is contracted to encompass only those elements not common to the second selected entity, and the logic is done, see 269. Referring back to 265, if the first group is fully contained within the selected second entity, then the first group is undefined and the logic is done, see 267. This means that the selected entity could contain only those elements of the first group, or more.

Embodiments of the present invention employ various processes involving data stored in or transferred through one or more computer systems. The processes presented herein are not inherently related to any particular computer or other apparatus. In particular, various general-purpose machines may be used with programs written in accordance with the teachings herein.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 3:
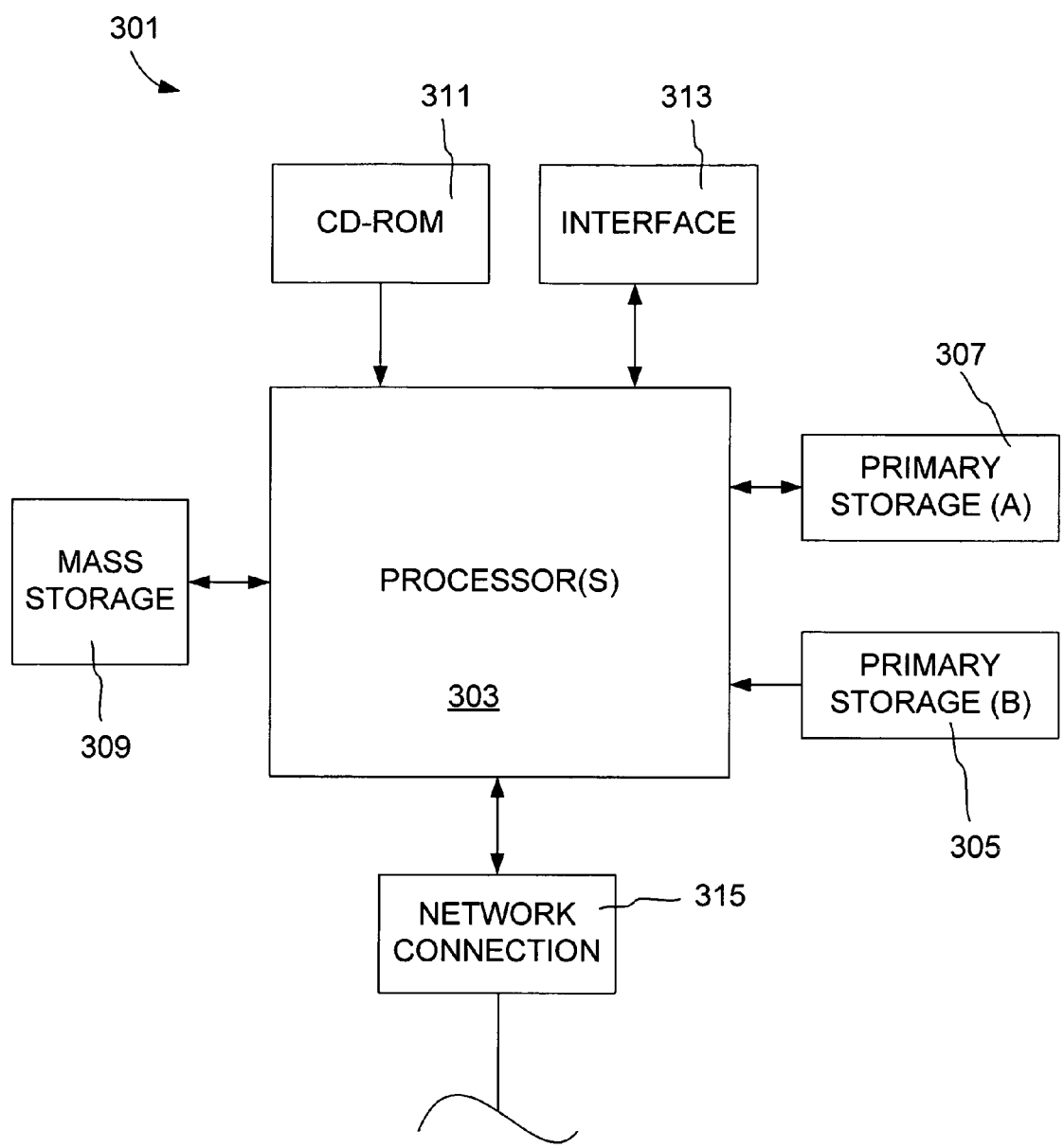
FIG. 3 is a simplified block diagram of a computer system that may be used to implement various aspects of the invention.

FIG. 3 illustrates a typical computer system that, when appropriately configured or designed, can serve as a system for implementing this invention. The computer system 301 includes any number of processors 303 (also referred to as central processing units, or CPUs) that are coupled to storage devices including primary storage 307 (typically a random access memory, or RAM), primary storage 305 (typically a read only memory, or ROM). CPU 303 may be of various types including microcontrollers and microprocessors such as programmable devices (e.g., CPLDs and FPGAs) and unprogrammable devices such as gate array ASICs or general purpose microprocessors. As is well known in the art, primary storage 305 acts to transfer data and instructions uni-directionally to the CPU and primary storage 307 is used typically to transfer data and instructions in a bi-directional manner. Both of these primary storage devices may include any suitable computer-readable media such as those described above. A mass storage device 309 is also coupled bi-directionally to CPU 303 and provides additional data storage capacity and may include any of the computer-readable media described above. Mass storage device 309 may be used to store programs, data and the like and is typically a secondary storage medium such as a hard disk. It will be appreciated that the information retained within the mass storage device 309, may, in appropriate cases, be incorporated in standard fashion as part of primary storage 307 as virtual memory. A specific mass storage device such as a CD-ROM 311 may also pass data uni-directionally to the CPU.

CPU 303 is also coupled to an interface 313 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 303 optionally may be coupled to an external device such as a database or a computer or telecommunications network using an external connection as shown generally at 315. With such a connection, it is contemplated that the CPU might receive information from the network, or might output information to the network in the course of performing the method steps described herein.

While this invention has been described in terms of a few preferred embodiments, it should not be limited to the specifics presented above. Many variations on the above-described preferred embodiments may be employed. Therefore, the invention should be broadly interpreted with reference to the following claims.

What is claimed is:

1. A method for logically segmenting a plurality of objects in a graphical user interface, the method comprising:
   selecting a first set from the plurality of objects;
   defining the first set as a first group with a first associated boundary; and modifying the first group in response to moving a selected entity across said first associated boundary, wherein moving a selected entity across said first associated boundary comprises determining if the selected entity is adjacent to the first associated boundary prior to moving the selected entity; and modifying the first associated boundary based upon the modified first group;

wherein the selected entity is an object, a second set, a second group, a plurality of groups, and combinations thereof within the plurality of objects.

2. The method of claim 1, wherein moving the selected entity across the first associated boundary occurs when any part of the selected entity is moved across the first associated boundary in a direction from outside the first group to within the first group.

3. The method of claim 2, further comprising:

adding all objects of the selected entity which are not already part of the first group to the first group; and expanding said first associated boundary to include all objects of the selected entity which were not already part of the first group.

4. The method of claim 3, further comprising:

subtracting a selected subset from any of the second group and the plurality of groups, included in the selected entity, from its corresponding group; and contracting each group's associated boundary to include only those objects remaining in that group.

5. The method of claim 1, wherein moving the selected entity across the first associated boundary occurs when any part of the selected entity is moved across the first associated boundary in a direction from within the first group to outside of the first group.

6. The method of claim 5, further comprising:

subtracting all objects of the selected entity from the first group; and contracting said first associated boundary to include only those objects remaining in the first group.

7. The method of claim 1, wherein moving the selected entity across the first associated boundary is done with a drag and drop function.

8. An apparatus for logically segmenting a list of elements in a graphical user interface, comprising:

means for selecting a first set from the list of elements;

means for defining the first set as a first group of contiguous elements wit a first associated boundary having a first upper limit and a first lower limit;

means for modifying the first group in response to moving a selected entity across said first associated boundary, wherein the selected entity is an element, a second set, a second group, a plurality of groups, and combinations thereof within the list of elements, and wherein moving a selected entity across said first associated boundary comprises determining if the selected entity is adjacent to the first associated boundary prior to moving the selected entity; and means for modifying the first associated boundary based upon the modified first group.

9. The apparatus of claim 8, wherein moving the selected entity across said first associated boundary occurs when any element of the selected entity is moved across the first upper limit or the first lower limit in a direction from outside the first group to within the first group.

10. The apparatus of claim 9, wherein moving the selected entity across said first associated boundary occurs when any element of the selected entity is moved across the first upper limit or the first lower limit in a direction from within the first group to outside of the first group.

11. The apparatus of claim 10, further comprising:

means for adding all elements of the selected entity which are not already part of the first group to the first group; and means for expanding said first associated boundary to include all elements of the selected entity which were not already part of the first group.

12. The apparatus of claim 11, further comprising:

means for undefining the second group and plurality of groups entirely contained within the selected entity by removal of their associated boundaries.

13. The apparatus of claim 12, further comprising:

means for subtracting a selected subset from any of the second group and the plurality of groups, included in the selected entity, from its corresponding group; and means for contracting each group's associated boundary to include only those objects remaining in that group.

14. The apparatus of claim 13, further comprising:

means for subtracting all elements of the selected entity from the first group; and means for contracting said first associated boundary to include only those elements remaining in the first group.

15. Computer program product for logically segmenting a plurality of objects in a graphical user interface, comprising:

computer code for selecting a first set from the plurality of objects;

computer code for defining the first set as a first group with a first associated boundary;

computer code for modifying the first group in response to moving a selected entity across said first associated boundary, wherein moving a selected entity across said first associated boundary comprises determining if the selected entity is adjacent to the first associated boundary prior to moving the selected entity;

computer code for modifying the first associated boundary based upon the modified first group, wherein the selected entity is an object, a second set, a second group, a plurality of groups, and combinations thereof within the plurality of objects; and computer readable medium for storing the computer code.

16. The computer program product of claim 15, wherein moving the selected entity across the first associated boundary occurs when any part of the selected entity is moved across the first associated boundary in a direction from outside the first group to within the first group.

17. The computer program product of claim 16, further comprising:

computer code for adding all objects of the selected entity which are not already part of the first group to the first group; and computer code for expanding said first associated boundary to include all objects of the selected entity which were not already part of the first group.

18. The computer program product of claim 17, further comprising undefining the second group and plurality of groups entirely contained within the selected entity by removal of their associated boundaries.

19. The computer program product of claim 15, wherein moving the selected entity across the first associated boundary occurs when any part of the selected entity is moved across the first associated boundary in a direction from within the first group to outside of the first group.

20. The computer program product of claim 15, wherein moving the selected entity across the first associated boundary is done with a drag and drop function.

* * * * *